United States Patent
Vugts et al.

(10) Patent No.: US 11,202,499 B2
(45) Date of Patent: Dec. 21, 2021

(54) LIGHT GUIDING UNIT

(71) Applicant: KONINKLIJKE PHILIPS N.V., Eindhoven (NL)

(72) Inventors: Marinus Arnoldus Martinus Vugts, Beetsterzwaag (NL); Pascal Jean Henri Bloemen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/959,868

(22) PCT Filed: Jan. 2, 2019

(86) PCT No.: PCT/EP2019/050004
§ 371 (c)(1),
(2) Date: Jul. 2, 2020

(87) PCT Pub. No.: WO2019/137831
PCT Pub. Date: Jul. 18, 2019

(65) Prior Publication Data
US 2020/0329859 A1 Oct. 22, 2020

Related U.S. Application Data

(60) Provisional application No. 62/615,469, filed on Jan. 10, 2018.

(51) Int. Cl.
*A46B 15/00* (2006.01)
*F21V 8/00* (2006.01)

(52) U.S. Cl.
CPC ........ *A46B 15/0044* (2013.01); *G02B 6/0036* (2013.01); *G02B 6/0045* (2013.01); *G02B 6/0051* (2013.01); *A46B 2200/1066* (2013.01)

(58) Field of Classification Search
CPC .................. A46B 15/0044; G02B 6/0036; G02B 6/0045; G02B 6/0041
USPC ........................................ 362/23.16
See application file for complete search history.

(56) References Cited

U.S. PATENT DOCUMENTS

| 5,128,842 | A | * | 7/1992 | Kenmochi | G02B 6/0061 |
| | | | | | 200/314 |
| 6,074,069 | A | * | 6/2000 | Chao-Ching | G02B 6/0061 |
| | | | | | 362/23.15 |
| 6,126,290 | A | * | 10/2000 | Veigel | E03C 1/0404 |
| | | | | | 239/18 |

(Continued)

FOREIGN PATENT DOCUMENTS

WO 2017129509 A1 8/2017

OTHER PUBLICATIONS

International Search Report, dated Apr. 16, 2019.

*Primary Examiner* — Bryon T Gyllstrom (57) ABSTRACT

There is provided a light guiding unit (10) for use in an oral cleaning device. The light guiding unit is configured to be coupled to a light source (50), and the light guiding unit comprises a homogenizing component (110) having a length along which light from the light source is guided. The homogenizing component is further configured such that at least one of an amount of refraction of the guided light and an amount of internal reflection of the guided light varies along the length to homogenize, along the length of the homogenizing component, an amount of light transmitting out of the homogenizing component.

17 Claims, 7 Drawing Sheets

(56) References Cited

U.S. PATENT DOCUMENTS

| | | | | |
|---|---|---|---|---|
| 7,460,751 | B2* | 12/2008 | Ruiz | G02B 6/0005 |
| | | | | 385/39 |
| 7,712,907 | B2* | 5/2010 | Zyka | G02B 5/045 |
| | | | | 362/16 |
| 9,746,603 | B2* | 8/2017 | Lee | G02B 6/0036 |
| 10,060,590 | B2* | 8/2018 | Lee | F21S 43/247 |
| 2002/0154511 | A1* | 10/2002 | Verlage | B60Q 3/292 |
| | | | | 362/487 |
| 2003/0026106 | A1* | 2/2003 | Knaack | B60Q 3/64 |
| | | | | 362/511 |
| 2003/0099113 | A1* | 5/2003 | Gebauer | F21S 41/24 |
| | | | | 362/511 |
| 2006/0039692 | A1* | 2/2006 | Lee | G03B 15/05 |
| | | | | 396/198 |
| 2007/0271714 | A1 | 11/2007 | Adam | |
| 2008/0010771 | A1 | 1/2008 | Hilscher | |
| 2011/0157899 | A1* | 6/2011 | Ko | G02B 6/0061 |
| | | | | 362/307 |
| 2012/0137454 | A1 | 6/2012 | Huy | |
| 2012/0170305 | A1* | 7/2012 | Rudek | G02B 6/001 |
| | | | | 362/581 |
| 2012/0251975 | A1 | 10/2012 | Iwahori | |
| 2017/0105823 | A1 | 4/2017 | Lueckel | |

\* cited by examiner

LIGHT GUIDING UNIT

This application is the U.S. National Phase application under 35 U.S.C. § 371 of International Application No. PCT/EP2019/050004, filed on Jan. 2, 2019, which claims the benefit of U.S. Provisional Application Ser. No. 62/615,469, filed Jan. 10, 2018. These applications are hereby incorporated by reference herein.

FIELD OF THE INVENTION

The present disclosure relates to a light guiding unit and a visual indicator comprising the light guiding unit for use in an oral cleaning device.

BACKGROUND OF THE INVENTION

Proper tooth brushing, including length and coverage of brushing, helps ensure long-term dental health. Many dental problems are experienced by individuals who either do not regularly brush their teeth or who do so inadequately, especially in a particular area or region of the oral cavity. Among individuals who do brush regularly, improper brushing habits can result in poor coverage of brushing and thus surfaces in the oral cavity may not be adequately cleaned during a cleaning session, even when a standard brushing regimen is followed.

To facilitate proper brushing, it is important to ensure that the user is applying the proper amount of pressure, as correct pressure enhances positive clinical results. In contrast, the user must avoid using excessive pressure during a cleaning session, as excessive pressure can result in tissue abrasion and damage. Furthermore, when an individual uses excessive pressure in applying a toothbrush to teeth, the pressure can cause the oscillations of the brush to slow. In many cases, the decreased oscillations of the brush prevent the numerous advantages otherwise gained by an electric toothbrush. This is especially true in the case of sonic vibrating toothbrushes. When excessive pressure causes these brushes to slow and oscillate at smaller amplitudes, the bristles no longer can induce proper vibration of the adjacent oral fluid. Consequently, advantages normally gained by using this type of toothbrush are substantially lost.

Pressure sensors can be used to monitor the pressure applied to the oral tissues during a cleaning session, and can warn a user that they are using excessive brushing force. For example, once the pressure sensor detects excessive pressure, it can provide a visual feedback in the form of light to a user about the amount of pressure being applied during an oral cleaning session.

SUMMARY OF THE INVENTION

In some of the current solutions for providing a visual feedback to a user of an oral cleaning device, a notification is provided by a visual indicator in the form of a light ring at the end of the oral cleaning device that can be illuminated when the pressure sensor of the oral cleaning device detects excessive pressure. The light ring is visible to the user when the cleaning end of the oral cleaning device is located within the user's mouth.

The internal structure for providing the light ring at the oral cleaning device typically comprises a printed circuit board, a flexible printed circuit substrate, a plurality of light sources (e.g. light-emitting diodes), a light guiding unit, and a light diffusing unit. The light guiding unit and the light diffusing unit are coupled to the plurality of light sources that are provided on the flexible printed circuit substrate, and the light diffusing unit is in a ring shape to as to provide an outer light ring appearance at the oral cleaning device. In this type of arrangement, the plurality of light sources have to be provided on the flexible printed circuit substrate, which is in turn electrically connected to the rigid printed circuit board, such that a desired amount of light can be guided towards a plurality of local positions along the length of the ring-shaped light diffusing unit. It is therefore expensive to manufacture the internal structure according to this type of arrangement due to the number of different components and materials required and the number of processes required.

As noted above, there are a number of disadvantages associated with the currently available solutions for providing visual feedback in the form of light output at an oral cleaning device. It would therefore be advantageous to provide an improved light guiding unit and a visual indicator for use in an oral cleaning device. For example, according to the different aspects of the embodiments described below, it would be possible to achieve homogeneity of outputted light at the light ring of the oral cleaning device without having to use a large number of light guiding components or a flexible printed circuit substrate at the oral cleaning device.

To better address one or more of the concerns mentioned earlier, in a first aspect, a light guiding unit for use in an oral cleaning device is provided. The light guiding unit is configured to be coupled to a light source, and the light guiding unit comprises a homogenizing component having a length along which light from the light source is guided. In addition, the homogenizing component is configured such that at least one of an amount of refraction of the guided light and an amount of internal reflection of the guided light varies along the length to homogenize, along the length of the homogenizing component, an amount of light transmitting out of the homogenizing component.

In some embodiments, the homogenizing component may comprise a plurality of hollow elements along its length so as to vary at least one of the amount of refraction of the guided light and the amount of internal reflection of the guided light along the length. In these embodiments, each of the plurality of hollow elements of the homogenizing component may be configured such that the size of a respective hollow element increases as a distance between the respective hollow element and a point at which light from the light source enters the homogenizing component increases. Moreover, in these embodiments, each of the plurality of hollow elements of the homogenizing component may be one of: prism-shaped, half-spherically-shaped, and pyramid-shaped.

In some embodiments, the homogenizing component may be configured such that a cross-sectional area along its length is varied so as to vary at least one of the amount of refraction of the guided light and the amount of internal reflection of the guided light along the length of the homogenizing component. In these embodiments, the homogenizing component may be configured such that the size of the cross-sectional area decreases as the distance from a point at which light from the light source enters the homogenizing component increases.

In some embodiments, the homogenizing component may comprise, along the length, at least one of: an internal reflective portion and a scattering element, so as to vary at least one of the amount of refraction of the guided light and the amount of internal reflection of the guided light along the length.

In some embodiments, the light guiding unit may further comprise a guide component configured to guide light from the light source to the homogenizing component. In these embodiments, the guide component may be configured such that its longitudinal axis is substantially perpendicular to the length of the homogenizing component.

In some embodiments, the homogenizing component may comprise a diverting portion configured to divert light from the guide component such that it travels along the length of the homogenizing component. In these embodiments, the diverting portion may be a v-shaped recess configured to divert light from the guide component in two directions in the homogenizing component. Also, in these embodiments, the diverting portion may comprise a reflective layer configured to reflect light from the guide component internally in the homogenizing component.

In some embodiments, the homogenizing component may have a ring shape, and the guide component is shaped so as to conform to a curvature of the homogenizing component.

According to a second aspect, there is provided a visual indicator for use in an oral cleaning device to provide usage feedback of the oral cleaning device to a user, the visual indicator comprising: a light guiding unit according to any of the preceding claims, wherein the light guiding unit is coupled to a light source; and a light diffusing unit coupled to the light guiding unit, wherein the light diffusing unit is configured to output diffused light from the light guiding unit.

According to a third aspect, there is provided a method for guiding light in a light guiding unit for use in an oral cleaning device, wherein the light guiding unit comprises a homogenizing component having a length along which light from a light source is guided, the method comprising varying at least one of an amount of refraction of guided light in the homogenizing component and an amount of internal reflection of the guided light along the length so as to homogenize, along the length of the homogenizing component, an amount of light transmitting out of the homogenizing component.

It will be appreciated that the embodiments described herein may be suitable for other types of oral cleaning devices which do not necessarily comprise a pressure sensor or other types of sensor and/or notification functionalities. For example, embodiments described herein may be suitable for a light ring at the oral cleaning device wherein the light ring has a primarily lighting purpose.

According to the aspects and embodiments described herein, the limitations of existing techniques are addressed. In particular, the above-described aspects and embodiments provide a light guiding unit for use in an oral cleaning device that has an optically efficient light guiding path and that can be manufactured at a reduced cost. The light guiding unit according to aspects and embodiments described herein enables guided light to be homogenized prior to entering a light diffuser, which leads to more efficient and homogenous light output at the oral cleaning device. There is thus provided an improved light guiding unit and an improved visual indicator for use in an oral cleaning device.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved light guiding unit, a visual indicator, and a method of guiding light in a light guiding unit which addresses the existing problems.

Figure 1:
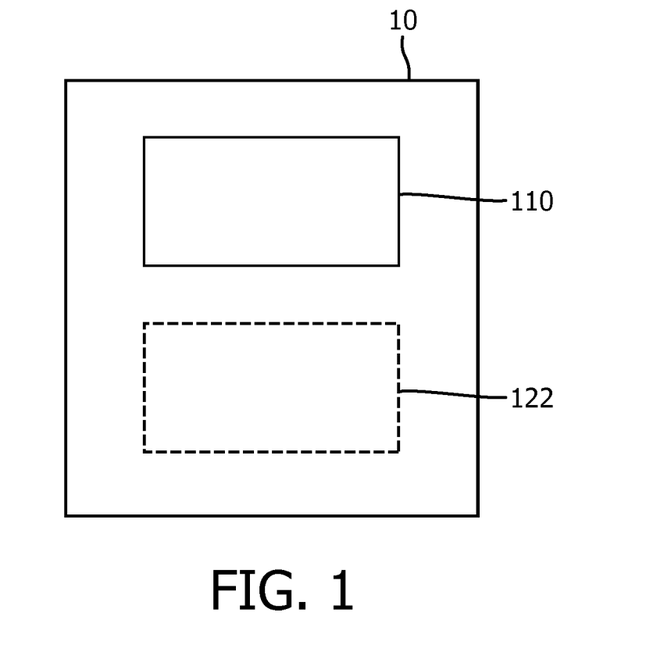
FIG. 1 is a block diagram of a light guiding unit according to an embodiment.
Figure 2:
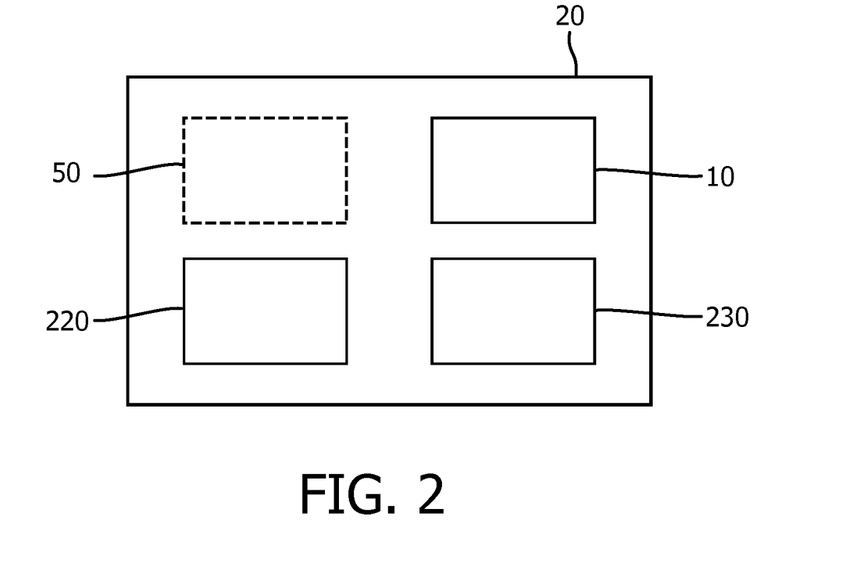
FIG. 2 is a block diagram of a visual indicator comprising the light guiding unit of FIG. 1.

FIG. 1 shows a block diagram of a light guiding unit 10 according to an embodiment which is for use in an oral cleaning device, such as an electric toothbrush, and FIG. 2 is a block diagram of a visual indicator 20 for use in an oral cleaning device, wherein the visual indicator comprises the light guiding unit 10 of FIG. 1.

The light guiding unit 10 is configured to couple to a light source, for example a light source provided at the oral cleaning device. In some embodiments, the light source may be provided on a printed circuit board in a visual indicator or an oral cleaning device. As shown in FIG. 1, the light guiding unit 10 comprises a homogenizing component 110 and may optionally comprise at least a first guide component 122.

The homogenizing component 110 has a length along which light from the light source is guided. Furthermore, the homogenizing component 110 is configured such that at least one of an amount of refraction of the guided light and an amount of internal reflection of the guided light varies along its length to homogenize, along the length of the homogenizing component 110, an amount of light transmitting out of the homogenizing component 110. The homogenizing component 110 may be made of any material suitable for guiding and transmitting light. For example, the homogenizing component 110 may be made of Perspex, acrylonitrile butadiene styrene (ABS), polyethylene terephthalate (PET), liquid silicone rubber (LSR), silicone rubber, polycarbonate, or other thermosetting or thermoplastic rubber like materials. The shape and/or dimensions of the homogenizing component 110 may be dependent on a number of factors, such as an intensity of transmitted light required at the visual indicator, and/or the dimensions of the oral cleaning device, etc.

Figure 3:
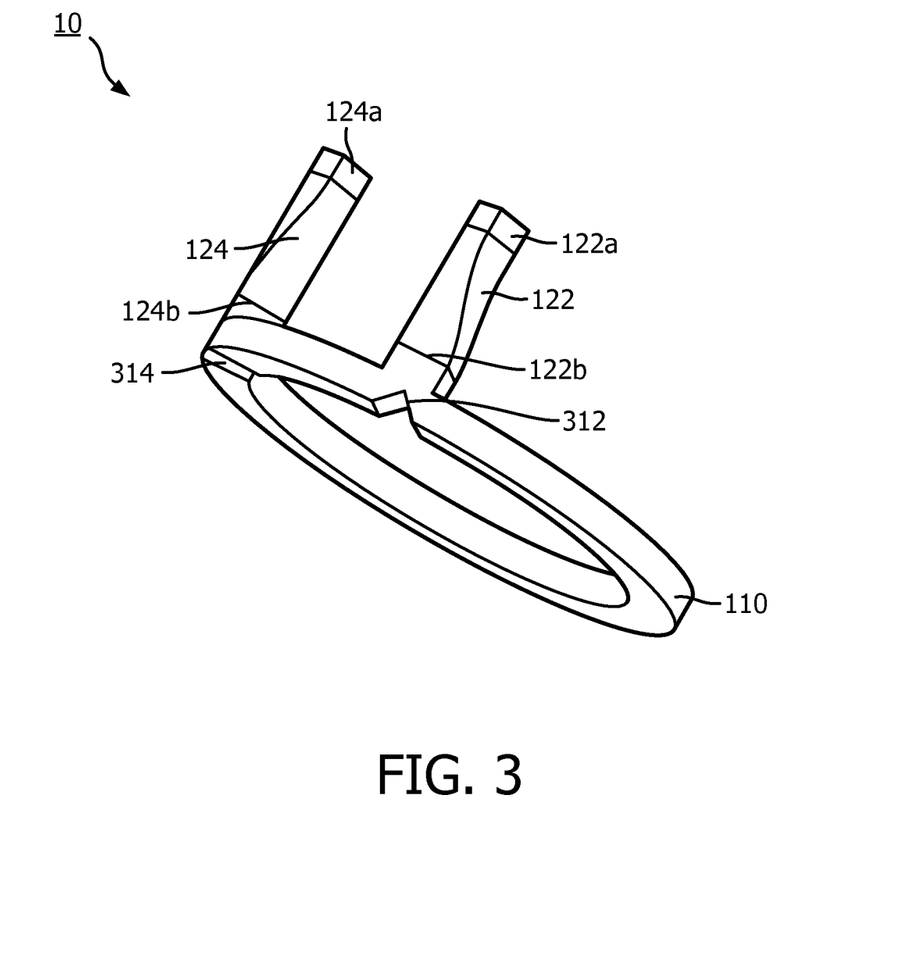
FIG. 3 is a perspective view of a light guiding unit according to an embodiment.

In some embodiments, the homogenizing component 110 may be a ring-shaped component, for example as illustrated in FIG. 3. In these embodiments, the at least one of the amount of refraction of the guided light and the amount of internal reflection of the guided light may be varied along the circumference of the homogenizing component 110 so as to homogenize the amount of light transmitting out of an outer surface along the circumference of the homogenizing component 110.

Although not illustrated in FIG. 1, in some embodiments the homogenizing component 110 may comprise a plurality of hollow elements along its length so as to vary at least one of the amount of refraction of the guided light and the amount of internal reflection of the guided light along the length of the homogenizing component 110. This will be described in further detail with reference to FIG. 5A and FIG. 5B.

Alternatively or additionally, in some embodiments the homogenizing component 110 may be configured such that the size of the cross-sectional area is varied to as to vary at least one of the amount of refraction of the guided light and the amount of internal reflection of the guided light along the length of the homogenizing component 110. For example, the size of the cross-section area of the homogenizing component 110 may abruptly increase or decrease at local point(s) along the length of the homogenizing component 110. As another example, the size of the cross-sectional area of homogenizing component 110 may increase or decrease gradually along the length of the homogenizing component 110. In some embodiments, the homogenizing component 110 may be configured such that the size of the cross-sectional area decreases as the distance from a point at which light from the light source enters the homogenizing component 110 increases. Therefore, an amount of refraction of the guided light increases along with the distance from the point at which light from the light source enters the homogenizing component 110, so as to counteract the attenuation of light along the homogenizing component 110.

Also, alternative or additionally, in some embodiments the homogenizing component 110 may comprise, along its length, at least one of an internal reflective portion and a scattering element. The internal reflective portion and/or the scattering element enables at least one of the amount of refraction of the guided light and the amount of internal reflection of the guided light to be varied along the length of the homogenizing component 110. Specifically, the internal reflective portion may cause an increase of the amount of internal reflection of the guided light at a local point along the length of the homogenizing component 110, which may lead to an increase of the amount of refraction of the guided light at the local point such that more light is transmitted out of the homogenizing component 110 at the local point. The scattering element may be a portion within the homogenizing component 110 which is made of a different material (and has a different refractive index) compared to the rest of the homogenizing component so as to vary at least one of an amount of refraction of the guided light and the amount of internal reflection of the guided light at the portion. The internal reflective portion may be a layer of reflective ink and/or reflective material applied to at least a portion of an inner surface of the homogenizing component 110 so as to increase reflectivity at the corresponding portion of the homogenizing component 110.

The light transmitting out of the homogenizing component 110 comprises refracted light out of the homogenizing component in one or more specific directions. It will be appreciated that according to Snell's Law, the direction of refracted light at a local point of the homogenizing component is dependent on an angle of incidence of a light ray at the local point of incidence and the refractive index of the material of the homogenizing component 110. For example, based on a refractive index of 1.495 (Perspex), if the angle of incidence is 30°, the angle of refraction would be 48.4°.

Moreover, it will also be appreciated that in some embodiments there may be attenuation at the interface between the homogenizing component 110 and air due to Fresnel reflection. The amount of transmission loss of light at the interface between the homogenizing component 110 and air may be determined using Fresnel equations.

The guide component(s) of the light guiding unit 10 may be directly coupled to the light source (e.g. of the visual indicator) so as to guide light from the light source towards the homogenizing component 110. In some embodiments, more than one guide components may be provided at the light guiding unit 10 so as to guide light into the homogenizing component at different local points to increase the efficiency of light transmission. This is explained in further detail with reference to FIG. 3. However, in some embodiments, the light guiding unit 10 may not comprise a guide component.

Although it is described above that the homogenizing component 110 may be a ring-shaped component, in alternative embodiments the homogenizing component 110 may be in other shapes, such as an arc shape. In alternative embodiments, the homogenizing component 110 may be shaped according to the dimensions and requirements of the visual indicator 20 and/or the oral cleaning device.

It will be appreciated that FIG. 1 only shows the components required to illustrate an aspect of the light guiding unit 10 and, in a practical implementation, the light guiding unit 10 may comprise alternative or additional components to those shown. For example, in some embodiments, the light guiding unit 10 may not comprise at least one guide component 122.

Referring to FIG. 2, the visual indicator 20 comprises the light guiding unit 10 as described with reference to FIG. 1, a light source 50, and a printed circuit board 220, and a light diffusing unit 230. The light source 50 may comprise at least one light-emitting diode (LED) or other types of suitable light source for use in an oral cleaning device, and the light source 50 may be provided on the printed circuit board 220.

Since the amount of light transmitting out of the homogenizing component 110 is homogenized by way of varying at least one of the amount of refraction of the guided light and the amount of internal reflection of the guided light, the light output originating from the light source 50 can be homogenously guided and transmitted from the light guiding unit 10 to the light diffusing unit 230 which then outputs diffused light to provide a uniform "light ring" visual effect at the oral cleaning device.

In some embodiments, the visual indicator 20 may not comprise the light source 50 or the printed circuit board 220. For example, a light source and/or a printed circuit board may be provided external to the visual indicator 20.

It will be appreciated that FIG. 2 only shows the components required to illustrate an aspect of the visual indicator and, in a practical implementation, the visual indicator 20 may comprise alternative or additional components to those shown. For example, in some embodiments, the visual indicator 20 may comprise a battery or other power supply for powering the visual indicator 20 or means for connecting the visual indicator 20 to a mains power supply.

Although it is described above that the oral cleaning device may be an electric toothbrush, it will be understood that in alternative embodiments the oral cleaning device may be a manual toothbrush. In these alternative embodiments, the manual toothbrush may have electrical components, but the brush head may not be mechanically actuated by an electrical component.

Figure 4:
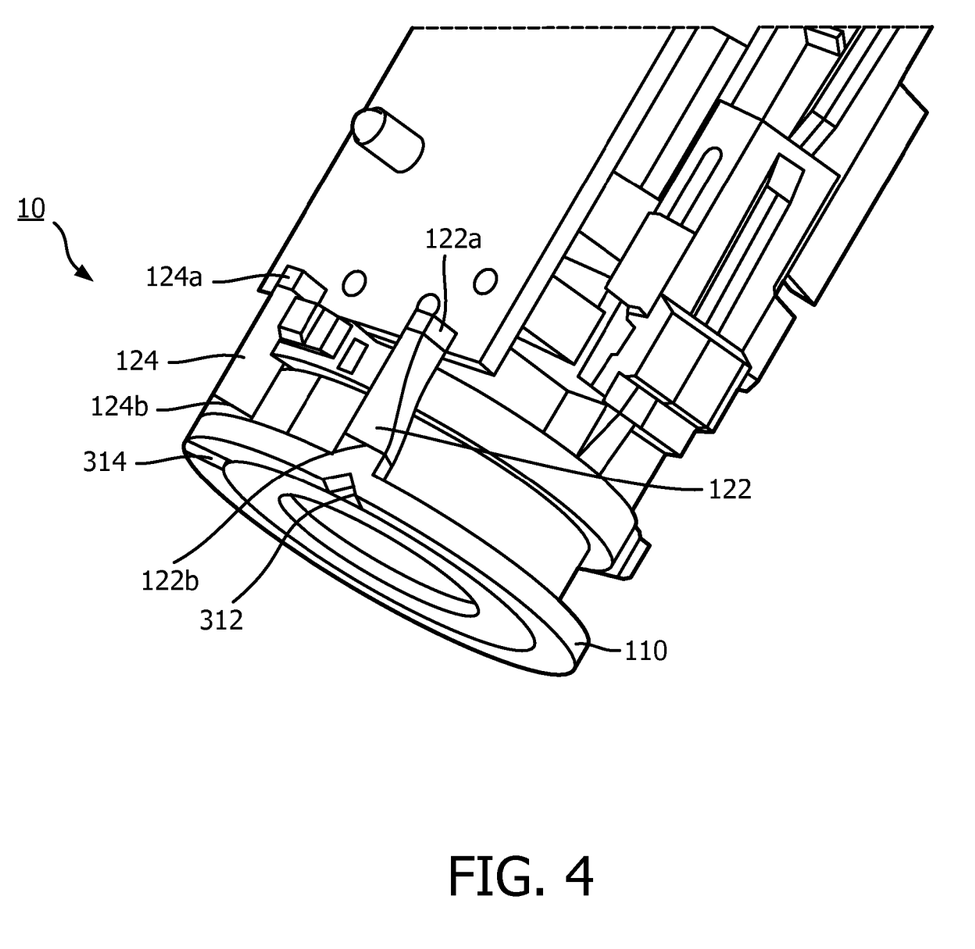
FIG. 4 is a perspective view of the light guiding unit of FIG. 3 as part of an internal assembly of an oral cleaning device.

FIG. 3 is a perspective view of a light guiding unit 10 according to an embodiment, and FIG. 4 is a perspective view of the light guiding unit 10 of FIG. 3 as part of an internal assembly of an oral cleaning device.

The light guiding unit 10 in this embodiment is configured to be coupled to a light source (not shown in the drawings), and the light guiding unit 10 comprises a homogenizing component 110, a first guide component 122, and a second guide component 124.

The light guiding unit 10 may be coupled to the rest of the internal assembly of the oral cleaning device, such as a drive assembly (not shown), which may comprise a motor or electromagnet(s) that generates movement of a transmission component for transmitting the generated movements to a brush head member of the oral cleaning device. The drive assembly may also comprise components such as a power supply, an oscillator, and one or more electromagnets, among other components.

The homogenizing component 110 in the present embodiment is a ring-shaped component, and light from the light source can be guided along a length of the homogenizing component 110. The homogenizing component 110 is further configured such that at least one of an amount of refraction of the guided light and an amount of internal reflection of the guided light varies along the length of the homogenizing component 110 so as to homogenize, along the length of the homogenizing component 110, an amount of light transmitting out of the homogenizing component 110. As shown in FIG. 3, the homogenizing component 110 in this embodiment further comprises a first diverting portion 312 and a second diverting portion 314, which will be described in more detail below.

Each of the first guide component 122 and the second guide component 124 is configured to guide light from the light source to the homogenizing component 110. In some embodiments, the first guide component 122 and the second guide component 124 may be made of the same material as that of the homogenizing component 110. In this embodiment, the first guide component 122 comprises a first end 122a and a second end 122b. The first end 122a of the first guide component 122 may be configured to be coupled to the light source (e.g. an LED on a printed circuit board), and the second end 122b of the first guide component may be coupled to the homogenizing component 110.

Similarly, the second guide component 124 in this embodiment comprises a first end 124a and a second end 124b. The first end 124a of the second guide component 124 may be configured to be coupled to the light source (e.g. another LED on a printed circuit board), and the second end 124b of the second guide component 124 may be coupled to the homogenizing component 110. As shown in FIG. 3, each of the first guide component 122 and the second guide component 124 is configured such that its longitudinal axis is substantially perpendicular to the length (i.e. the circumference in the present embodiment) of the homogenizing component 110.

Moreover, as shown in FIG. 3 and FIG. 4, each of the first guide component 122 and the second guide component 124 is shaped to conform to a curvature of the homogenizing component 110. In this embodiment, a portion of the first guide component 122 has a warped rectangular prism shape so as to allow a gradual transition from the first end 122a, to the second end 122b, which is orientated to correspond to the curvature of the homogenizing component 110 at the point of coupling between the first guide component 122 and the homogenizing component 110. Similarly, a portion of the second guide component 124 in the present embodiment also has a warped rectangular prism shape so as to allow a gradual transition from the first end 124a to the second end 124b. By using guide component(s) that are shaped so as to enable coupling to a flat printed circuit board, embodiments described herein eliminate the need for flexible printed circuit substrates in the assembly (or the visual indicator or the oral cleaning device), which in turn reduces manufacturing costs.

As mentioned above, the homogenizing component 110 in this embodiment comprises the first diverting portion 312 and the second diverting portion 314. As shown in FIG. 3, the first diverting portion 312 and the second diverting portion 314 in the present embodiment are positioned such that each of the first diverting portion 312 and the second diverting portion 314 respectively correspond to the positions at which the first guide component 122 and the second guide component 124 are coupled to the homogenizing component 110. Therefore, light that is guided via the first guide component 122 can be diverted by the first diverting portion 312 and light that is guided via the second guide component 124 can be diverted by the second diverting portion 314.

As shown in FIG. 3 and FIG. 4, each of the first diverting portion 312 and the second diverting portion 314 in the present embodiment is a v-shaped recess. Therefore, each of these diverting portions 312, 314 is configured to reflect light from the corresponding guide component in two directions in the homogenizing component 110. In other words, light that is guided via the first guide component 122 can be diverted by the two inclined faces of the v-shaped recess of the first diverting portion 312 in opposite directions along the ring-shaped homogenizing component 110, and similarly, light that is guided via the second guide component 124 can be diverted by the two inclined faces of the v-shaped recess of the second diverting portion 314 in opposite directions along the ring-shaped homogenizing component 110.

In some embodiments, at least one of the first diverting portion 312 and the second diverting portion may further comprise a reflective layer configured to reflect light from the corresponding guide component internally in the homogenizing component. For example, in some embodiments the first diverting portion 312 may comprise a reflective layer so as to increase reflectivity and thereby improving effectiveness of the diversion of light from the first guide component 122.

Although in the present embodiment the light guiding unit 10 comprises two guide components 122 and 124, in alternative embodiments the light guiding unit may comprise a single guide component configured to guide light from a light source to the homogenizing component.

Although it is described above that each of the first guide component 122 and the second guide component 124 is configured such that its longitudinal axis is substantially perpendicular to the length of the homogenizing component 110, in alternative embodiments the guide component(s) may not necessarily be perpendicular to the length of the homogenizing component. The orientation of the guide component(s) with respect to the homogenizing component may be dependent on a position and/or an orientation of the light guiding unit within the visual indicator of the oral cleaning device or within the oral cleaning device.

Figure 5A:
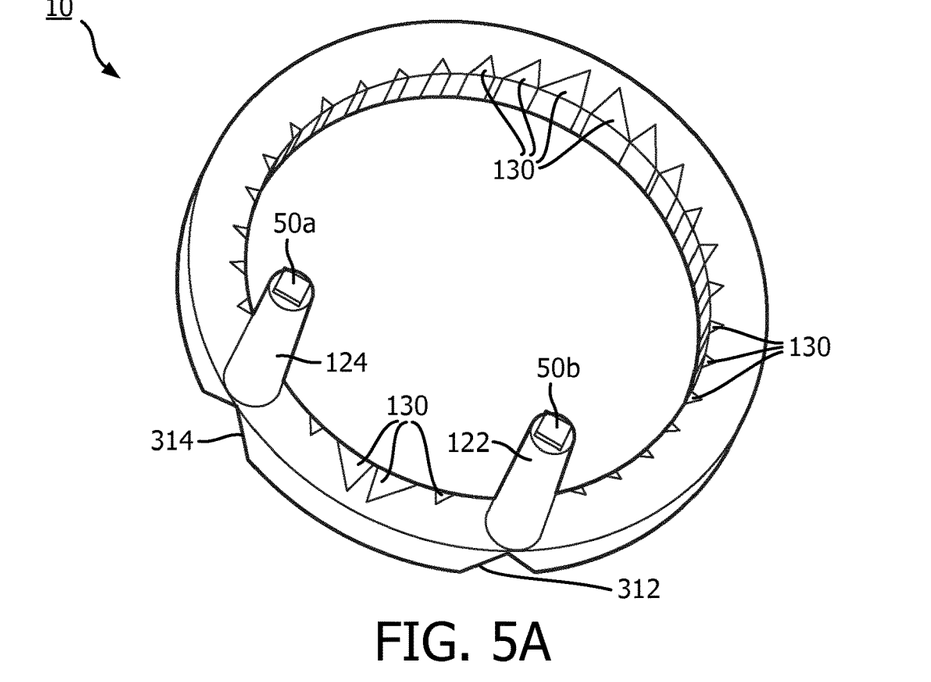
FIG. 5A is a perspective view of a light guiding unit according to an embodiment.
Figure 5B:
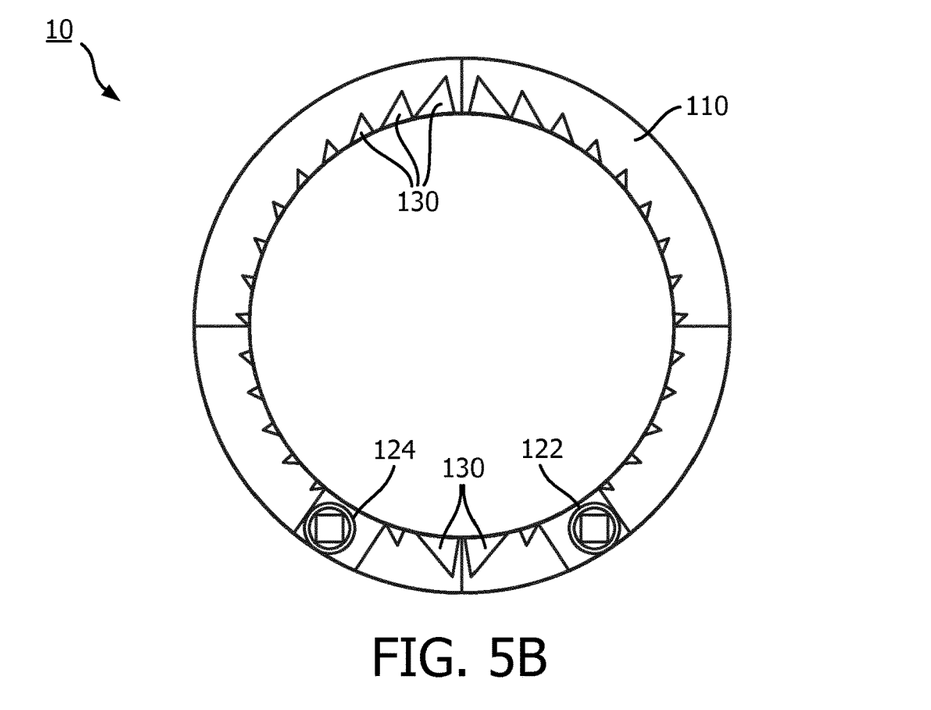
FIG. 5B is a plan view schematic diagram illustrating the internal structure of the light guiding unit of FIG. 5A.

FIG. 5A is a perspective view of a light guiding unit 10 according to an embodiment, and FIG. 5B is a plan view schematic diagram illustrating the internal structure of the light guiding unit 10 of FIG. 5A. The light guiding unit 10 in this embodiment comprises a homogenizing component 110, a first guide component 122, and a second guide component 124. The homogenizing component 110 in this embodiment comprises a plurality of hollow elements 130 arranged along the length of the homogenizing component 110.

As shown in FIG. 5A and FIG. 5B, the homogenizing component 110 in the present embodiment is a ring-shaped component, and light from a first light source 50a and a second light source 50b can be guided along a length of the homogenizing component 110. The homogenizing component 110 is further configured such that at least one of an amount of refraction of the guided light and an amount of internal reflection of the guided light varies along the length of the homogenizing component 110 so as to homogenize, along the length of the homogenizing component 110, an amount of light transmitting out of the homogenizing component 110. The homogenizing component 110 in this embodiment further comprises a first diverting portion 312 and a second diverting portion 314, which will be described in more detail below.

In this embodiment, the first guide component 122 and the second guide component 124 are respectively coupled to the first light source 50a and the second light source 50b, so that each of these guide components 122, 124 can guide light, respectively from the first light source 50a and the second light source 50b, to the homogenizing component 110. As shown in FIG. 5A, the first guide component 122 and the second guide component 124 are positioned so as to correspond to a position of the respective light source. As will be described in more detail with respect to FIG. 7A, in some embodiments the first light source 50a and the second light source 50b may be provided on a printed circuit board of a visual indicator of an oral cleaning device.

In addition, in the present embodiment each of the first guide component 122 and the second guide component 124 has a conical frustum shape. For each of the first guide component 122 and the second guide component 124 in the present embodiment, the end which is coupled to the light source has a smaller cross-sectional area than that of the opposite end which is coupled to the homogenizing component 110. The end with the smaller cross-sectional area may correspond to a size of the corresponding light source, while the opposite end with the larger cross-sectional area may correspond to a thickness or width of the homogenizing component 110.

Each of the plurality of hollow elements 130 corresponds to a part of the homogenizing component 110 with the material removed, so as to form a hollow or empty space (i.e. replaced by atmospheric air). In this embodiment, each of the plurality of hollow elements 130 is prism-shaped to cause a change in an amount of internal reflection of guided light along the length of the homogenizing component 110. Specifically, each of the plurality of hollow elements 130 in the present embodiment is configured such that there is an abrupt change in the surface normal direction in the homogenizing component 110 compared to the otherwise substantially constant surface normal direction and/or substantially gradual change in the surface normal direction along the length of the homogenizing component 110.

In this embodiment, since the first guide component 122 and the second guide component 124 are positioned towards the bottom side of the light guiding unit 10 (in the plan view as shown in FIG. 5B), the plurality of hollow elements 130 are positioned symmetrically along the length (i.e. circumference in the present embodiment) of the homogenizing component 110 so as to ensure light entering the homogenizing component 110 via the first guide component 122 and light entering the homogenizing component 110 via the second guide component 124 is homogenized in the same manner at each half of the ring-shaped homogenizing component 110.

Although it is described above that each of the plurality of hollow elements 130 is prism-shaped, in alternative embodiments the plurality of hollow elements in the homogenizing component may have a different shape, such as half-spherical shape or pyramid shape. Moreover, each of the plurality of hollow elements in alternative embodiments may have a different shape. For example, in some embodiments the plurality of hollow elements may comprise a first group of hollow elements wherein each of the first group of hollow elements is prism-shaped and a second group of hollow elements wherein each of the second group of hollow elements is half-spherically shaped. The respective positions and the sizes of each of plurality of hollow elements may be dependent on the dimensions and a shape of the homogenizing component 110. For example, in some embodiments, a size of each of the plurality of hollow elements may increase as the distance between the respective hollow element and a point at which light from the light source enters the homogenizing component increases. Furthermore, in some embodiments, the number of hollow elements per distance unit may be varied along the length of the homogenizing component. For example, the number of hollow elements per distance unit may increase as the distance from a point at which light from the light source enters the homogenizing component increases.

Although in the present embodiment the homogenizing component 110 has a constant cross-sectional area throughout its length, in alternative embodiments the cross-sectional area of the homogenizing component 110 may vary along its length. In these alternative embodiments, the sizes of each of the plurality of hollow elements 110 may be the same. For example, in some embodiments the cross-sectional area of the homogenizing component 110 may decrease as the distance from a point at which light from the light source enters the homogenizing component increases. In these embodiments, the sizes of each of the plurality of hollow elements that are positioned along the length of the homogenizing component may be the same so as to achieve a decreasing local cross-sectional area along the length of the homogenizing component towards a direction away from a point at which light from the light source enters the homogenizing component.

Although in the present embodiment the light guiding unit 10 comprises two guide components 122 and 124, in alternative embodiments the light guiding unit may comprise a single guide component configured to guide light from a light source to the homogenizing component. Furthermore, although in the present embodiment the first guide component 122 and the second guide component 124 are positioned towards a bottom side of the light guiding unit 10 (in the plan view), in alternative embodiments the first guide component and the second guide component may have different positions in the light guiding unit so as to correspond to the positions of the light source(s) to which they are coupled. The position of the guide component(s) may also be dependent on a number of other factors, including the dimensions of the light guiding unit.

Figure 6:
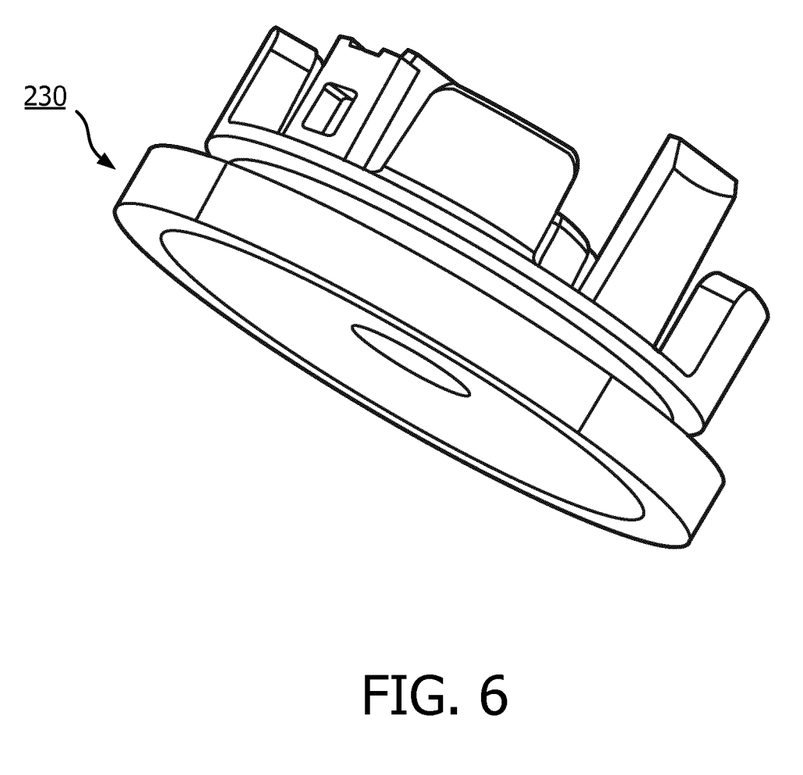
FIG. 6 is a perspective view of a light diffusing unit which may be used in conjunction with the light guiding unit as described in the embodiments herein.

FIG. 6 is a perspective view of a light diffusing unit 230 which may be used in conjunction with the light guiding unit as described in the embodiments herein. As shown in FIG. 6, in the present embodiment the light diffusing unit 230 may comprise a circular body so as to for example accommodate the ring-shaped homogenizing component 110 of the light guiding unit 10 as described with reference to FIG. 5A and FIG. 5B. In some embodiments, the light diffusing unit 230 may be made of the same material of the light guiding unit 10, or a different material which is also capable of light transmission, e.g. Perspex or polycarbonate. Although not illustrated in the drawings, in some embodiments, and in particular in embodiments where the light guiding unit and the light diffusing unit 230 are made of the same material, the light guiding unit may be formed together with the light diffusing unit 230 as a single component. An exemplary embodiment in which the light diffusing unit 230 is used in conjunction with the light guiding unit 10 of FIG. 5A and FIG. 5B is provided with reference to FIG. 7A, and FIG. 7B.

Figure 7A:
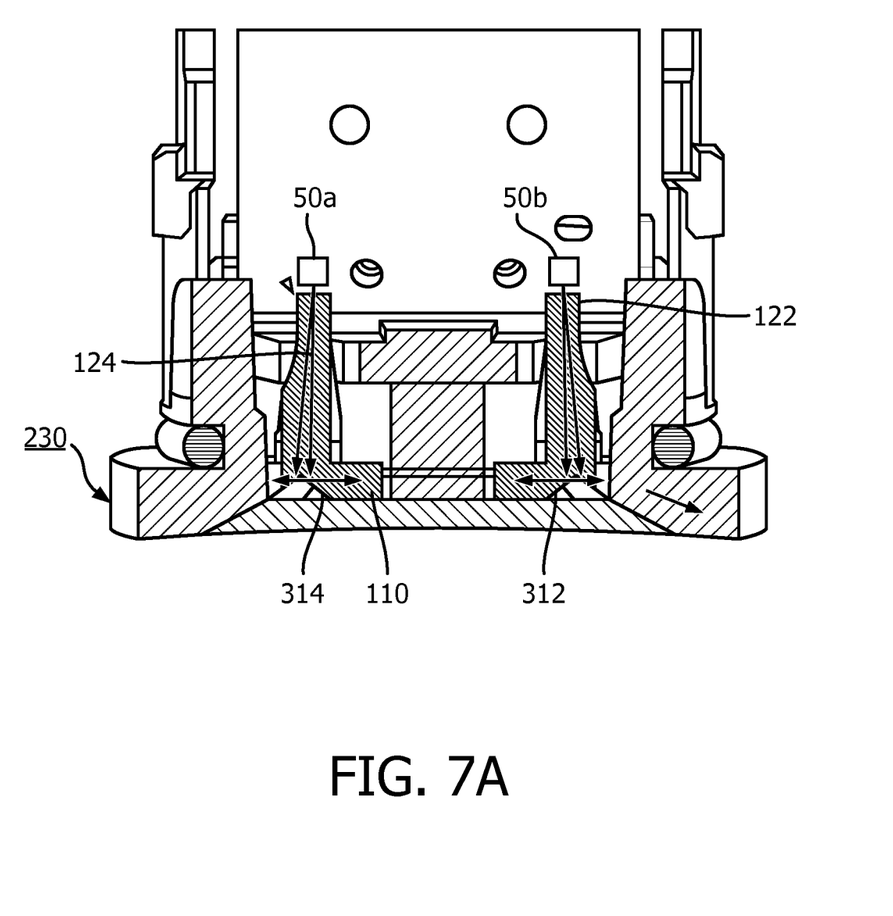
FIG. 7A is a cross-sectional diagram illustrating a part of an internal assembly of an oral cleaning device according to an embodiment.
Figure 7B:
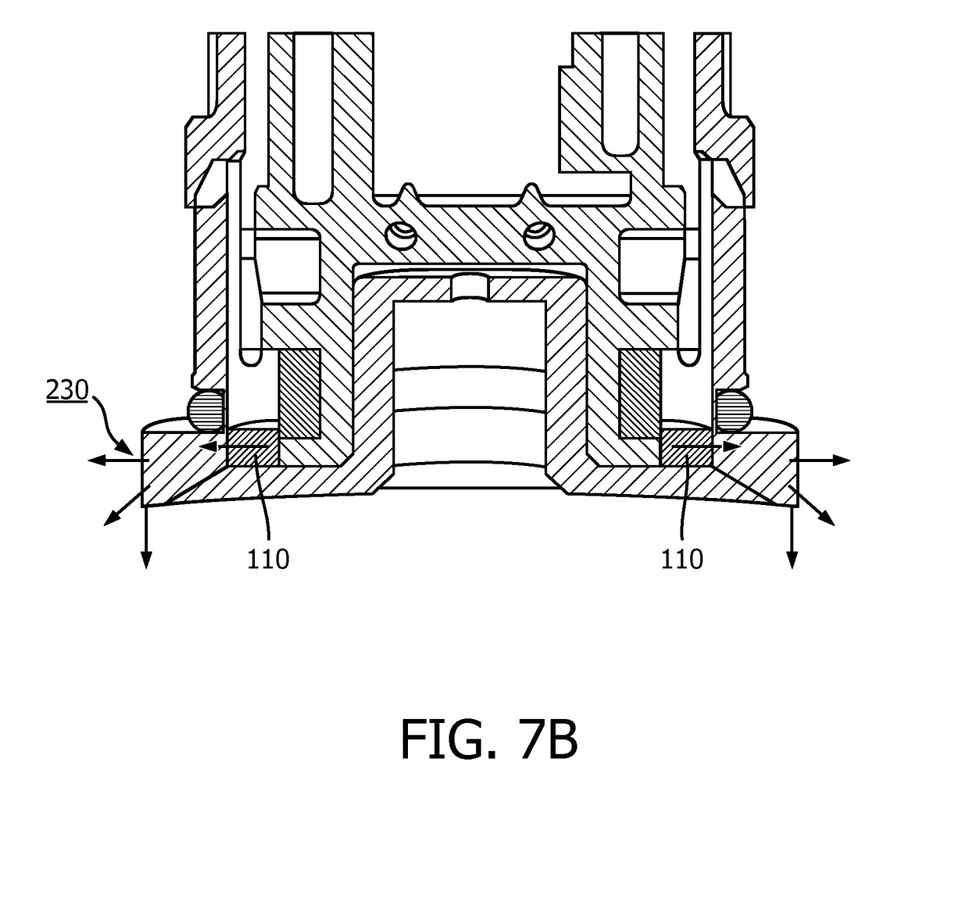
FIG. 7B is another cross-sectional diagram of the part of an oral cleaning device of FIG. 6.

In more detail, FIG. 7A and FIG. 7B are two different cross-sectional diagrams illustrating a part of an internal assembly of an oral cleaning device. In additional to the light diffusing unit 230 and the light guiding unit 10, the internal assembly in this embodiment further comprises a printed circuit board on which the first light source 50a and the second light source 50b are provided, which is illustrated in FIG. 7B.

Referring to FIG. 7A which illustrates a cross-section of the part of the internal assembly through the first guide component 122 and the second guide component 124 of the light guiding unit 10, the light guiding unit 10 may be coupled to the light diffusing unit 230 by way of fitting into a cavity space in the circular body of the light diffusing unit 230 such that an outer surface of the light guiding unit 10 is in direct contact with an inner surface of the light diffusing unit 230. Light from the first light source 50a and the second light source 50b maybe respectively guided into the homogenizing unit 110 of the light guiding unit 10 via the first guide component 122 and the second guide component 124 in the directions as indicated by the arrows in FIG. 7A. The light may then be diverted by the first diverting portion 312 and the second diverting portion 314 in the homogenizing component 110 in the directions as indicated by the arrows in FIG. 7A. A portion of this diverted light may be transmitted out of the homogenizing component 110 by way of refraction and into the circular body of the light diffusing unit 230, in the directions as indicated by the arrows in FIG. 7A.

As light that is diverted by the first diverting portion 312 and the second diverting portion 314 is guided though the length of the homogenizing component 110, at least a portion of the guided light is transmitted out of the homogenizing component 110 by way of refraction, in the directions as indicated by the arrows in FIG. 7B. As explained above with reference to FIG. 5A and FIG. 5B, the amount of light transmitting out of the homogenizing component 110 is homogenized along the length of the homogenizing component 110, due to the presence of the plurality of hollow elements varying at least one of the amount of refraction of the guided light and the amount of internal reflection of the guided light along the length of the homogenizing component 110. Therefore, the light output originating from the first light source 50a and the second light source 50b can be homogenously guided and transmitted from the light guiding unit 10 to the light diffusing unit 230. Then, diffused light can be output from the light diffusing unit 230 to provide a uniform "light ring" visual effect at the oral cleaning device.

According to some embodiments, there may be provided a method for guiding light in a light guiding unit for use in an oral cleaning device, wherein the light guiding unit comprises a homogenizing component having a length along which light from a light source is guided, the method comprising varying at least one of an amount of refraction of guided light in the homogenizing component and an amount of internal reflection of the guided light along the length so as to homogenize, along the length of the homogenizing component, an amount of light transmitting out of the homogenizing component.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A light guiding unit for use in an oral cleaning device, wherein the light guiding unit is configured to be coupled to a light source, the light guiding unit comprising:
    a homogenizing component having a length along which light from the light source is guided, wherein the homogenizing component is configured such that at least one of an amount of refraction of the guided light and an amount of internal reflection of the guided light varies along the length to homogenize, along the length of the homogenizing component, an amount of light transmitting out of the homogenizing component;
    the homogenizing component comprising a plurality of hollow elements distributed along an inner circumference of the homogenizing component and having dimensions that vary along the inner circumference in a manner that causes the amount of light which is transmitted out of the homogenizing component to be homogenous along the length of the homogenizing component by varying at least one of the amount of refraction of the guided light and the amount of internal reflection of the guided light along the length, and wherein each of the plurality of hollow elements corresponds to a part of the homogenizing component at a position along the inner circumference where material is removed so as to form a hollow.

2. A light guiding unit according to claim 1, wherein each of the plurality of hollow elements of the homogenizing component is configured such that the size of a respective hollow element increases as a distance between the respective hollow element and a point at which light from the light source enters the homogenizing component increases.

3. A light guiding unit according to claim 1, wherein each of the plurality of hollow elements of the homogenizing component is one of: prism-shaped, half-spherically-shaped, and pyramid-shaped.

4. A light guiding unit according to claim 1, wherein the homogenizing component is configured such that a cross-sectional area along its length is varied so as to vary at least one of the amount of refraction of the guided light and the amount of internal reflection of the guided light along the length of the homogenizing component.

5. A light guiding unit according to claim 4, wherein the homogenizing component is configured such that the size of the cross-sectional area decreases as the distance from a point at which light from the light source enters the homogenizing component increases.

6. A light guiding unit according to claim 1, wherein the homogenizing component comprises, along the length, at least one of: an internal reflective portion and a scattering element, so as to vary at least one of the amount of refraction of the guided light and the amount of internal reflection of the guided light along the length.

7. A light guiding unit according to claim 1, further comprising at least one guide component configured to guide light from the light source to the homogenizing component.

8. A light guiding unit according to claim 7, wherein the at least one guide component is configured such that its longitudinal axis is substantially perpendicular to the length of the homogenizing component.

9. A light guiding unit according to claim 7, wherein the homogenizing component comprises a diverting portion configured to divert light from the guide component such that it travels along the length of the homogenizing component.

10. A light guiding unit according to claim 9, wherein the diverting portion is a v-shaped recess configured to divert light from the guide component in two directions in the homogenizing component.

11. A light guiding unit according to claim 9, wherein the diverting portion comprises a reflective layer configured to reflect light from the guide component internally in the homogenizing component.

12. A light guiding unit according to claim 7, wherein the homogenizing component has a ring shape, and the guide component is shaped so as to conform to a curvature of the homogenizing component.

13. A visual indicator for use in an oral cleaning device to provide usage feedback of the oral cleaning device to a user, the visual indicator comprising:
    a light guiding unit according to claim 1, wherein the light guiding unit is coupled to a light source; and
    a light diffusing unit coupled to the light guiding unit, wherein the light diffusing unit is configured to output diffused light from the light guiding unit.

14. A light guiding unit according to claim 1, wherein the size of a respective hollow element increases as a distance between the respective hollow element and a point at which light from the light source enters the homogenizing component increases.

15. A light guiding unit according to claim 1, wherein the homogenizing component emits light from an outer circumference of the homogenizing component.

16. A method for guiding light in a light guiding unit for use in an oral cleaning device, the light guiding unit comprising a homogenizing component having a length along which light from a light source is guided, the method comprising
    varying at least one of an amount of refraction of guided light in the homogenizing component and an amount of internal reflection of the guided light along the length so as to homogenize, along the length of the homogenizing component, an amount of light transmitting out of the homogenizing component;
    the homogenizing component comprising a plurality of hollow elements distributed along an inner circumference of the homogenizing component and having dimensions that vary along the inner circumference in a manner that causes the amount of light which is transmitted out of the homogenizing component to be homogenous along the length of the homogenizing component by varying the amount of refraction of the guided light and the amount of internal reflection of the guided light along the length, and wherein each of the plurality of hollow elements corresponds to a part of the homogenizing component at a position along the inner circumference where material is removed so as to form a hollow.

17. A visual indicator for use in an oral cleaning device to provide usage feedback of the oral cleaning device to a user, the visual indicator comprising:
- a light guiding unit coupled to a light source, the light guiding unit including:
  - a homogenizing component having a length along which light from the light source is guided, wherein the homogenizing component is configured such that at least one of an amount of refraction of the guided light and an amount of internal reflection of the guided light varies along the length to homogenize, along the length of the homogenizing component, an amount of light transmitting out of the homogenizing component;
  - the homogenizing component comprising a plurality of hollow elements distributed along the length of the homogenizing component and having dimensions that vary along its length in a manner that causes the amount of light which is transmitted out of the homogenizing component to be homogenous along the length of the homogenizing component by varying at least one of the amount of refraction of the guided light and the amount of internal reflection of the guided light along the length, and wherein each of the plurality of hollow elements corresponds to a part of the homogenizing component at a position along its length with material removed so as to form a hollow; and
- a light diffusing unit coupled to the light guiding unit, wherein the light diffusing unit is configured to output diffused light from the light guiding unit.

* * * * *